Nov. 26, 1946.  F. W. MANNING  2,411,659
TIRE CONSTRUCTION
Filed Aug. 5, 1942
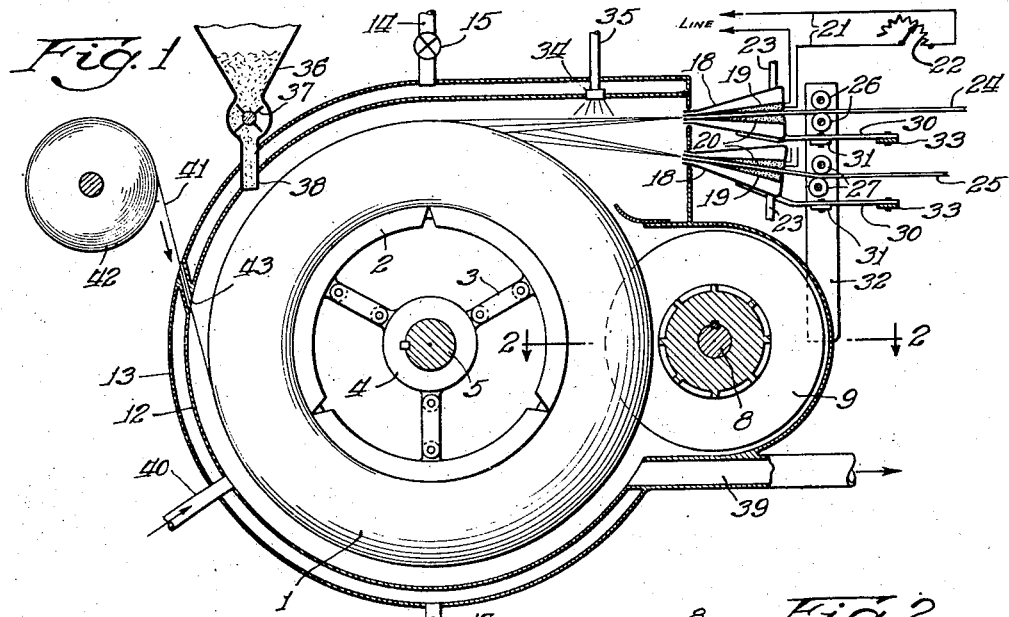
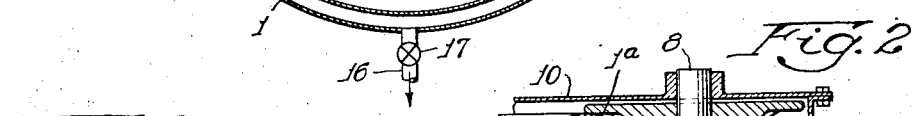
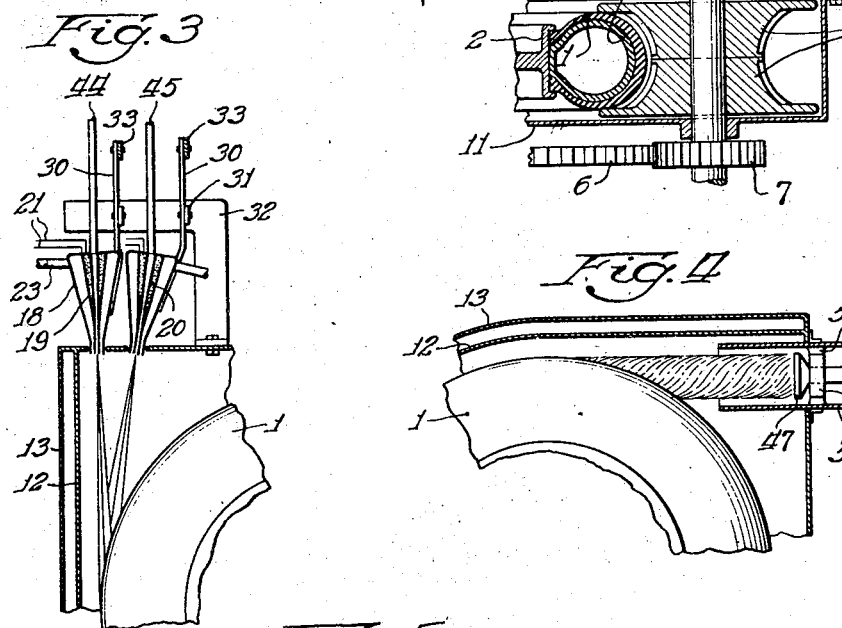
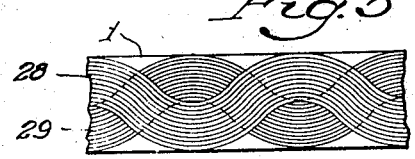
Inventor:
Fred W. Manning Patented Nov. 26, 1946

2,411,659

UNITED STATES PATENT OFFICE 2,411,659

TIRE CONSTRUCTION

Fred W. Manning, Palo Alto, Calif.

Application August 5, 1942, Serial No. 453,630

15 Claims. (Cl. 154—9)

My invention relates to the spinning of synthetic fibre forming materials in the manufacture of fabrics, felts, and the like, and particularly to spun plastic fabrics as a substitute for woven fabrics, rubber treads, etc., in the manufacture of tires. This application is a continuation-in-part of my copending applications, Method and apparatus for spinning unwoven fabrics, Serial No. 414,809, filed October 13, 1941, subsequently issued as Patent No. 2,336,743; Spun fabrics, Serial No. 423,733, filed December 20, 1941, issued as Patent No. 2,336,745, dated December 14, 1943; and Glass spinning, Serial No. 439,026, filed April 15, 1942.

In view of the fact that in this year 1942, it seems certain that the synthetic rubber manufacturers will not be able to supply the demand for rubber for a long time to come, the logical thing for this country to do is to make full use of what we now have in the way of tires. In other words, it is the object of this invention to recondition our present tires by spinning thereover a plurality of plies of non-woven plastic fabrics in which are incorporated suitable treads, and vulcanizing or otherwise curing the reinforcements; and these operations can be repeated over and over again, as the plies wear out. Such reinforcements may have elastomeric characteristics and may be made sufficiently flexible for tire purposes, and more resistant to disintegration from wear, heat, water, and oil, than the rubber used heretofore; and the spinning of reinforcements to give a perfectly balanced tire will be equally applicable to all sizes of tires and irrespective of how irregular are the worn portions of the tires. However, to have maximum strength to meet such qualifications, the fabric is preferably integral and homogeneous, i. e., all of one piece and of the same material throughout. Neither a woven fabric nor a web of discrete fibres is integral, and, of course, fabrics in which the fibres or threads are bonded by adhesives are not homogeneous.

The worn tire may be buffed, and coated with an adhesive, or by a strip of uncured rubber bonded to the old rubber by an adhesive, as in prior tire practice. The plastic fabric may then be spun from a molten, solution, or other state, and the spun fabric embedded in, and/or bonded to, the surface of the rubber tire to be reinforced. If the fabric is spun from a molten state there should be maintained: a spinning temperature sufficiently above the softening point of the rubber surface; if the latter is to be vulcanized to the spun fabric; a temperature for the surface of the tire sufficiently high to prevent a too rapid cooling of the deposited filaments; and a sufficient tension on the filaments prior to deposition. And the contraction of the filaments in cooling will accentuate the embedding action. The tension of the filaments between the tire and spinneret, not only aids the union between the tire and spun fabric, but it also serves to stretch, or orient the molecular structure of, the filaments. The stretching and resultant strengthening of the filaments sometimes can be facilitated by means of an inert, rapid cooling, or quenching fluid, the temperature of which, if possible, should be maintained above the softening point of the rubber. In other words, a polyamide may be spun at a temperature of 500° F., the spun filaments quenched by water at a temperature of 325° F., the quenched filaments extended at the quenching temperature, and the extended filaments then embedded in, and/or bonded to, a rubber whose softening point is 300° F. Or, the filaments sometimes may be solidified at a much lower temperature, and then cold drawn, which may be accomplished before, during, or even after deposition. However, when spinning from a molten state a filamentous structure must be formed either at a molten temperature, or be brought back to such a temperature, in order to be welded together autogeneously and become an integral fabric. Or, a plastic may be spun from a solution state, during which the filaments are suitably stretched, and an evaporative elastic fluid, such as heated air, and/or an inert coagulating fluid, such as water, used to remove the solvent and/or indurate the spun filaments; and such a fabric to be integral must also be formed by the overlapping of the filaments while in an adhesive state. However, as already indicated, if filaments spun from a molten, solution, or other state, cannot be embedded in the rubber of the tire being reinforced by the deposition of such filaments under tension at a suitable temperature, then a solvent, common to both rubber and plastic, and/or a suitable adhesive, such as the usual materials used for bonding a camelback to a worn tire or rubber to synthetic threads, may be used to bond the spun fabrics to the worn casing, after which the reinforced tire may be vulcanized or otherwise cured.

In the above mentioned patent applications, I have described integral homogeneous fabrics, which were formed from disrupted and dispersed filaments welded together while in a plastic condition. Such fabrics may be used for the reinforcement of tires, but usually I prefer to use either filaments of substantial length, or filaments of continuous length. By "filaments of substantial length," I mean those whose length is sufficient to reach from the point at which the spinning material is divided into filaments to their pulling means, which in the present case is the point of their deposition on the tire. The stretching may, therefore, result from: the periphery of the tire travelling at a greater speed than that at which the spinning material is extruded or otherwise divided into filaments; the impingement and propelling action of a fluid used to separate the filaments and/or convey them at an accelerated speed in the direction of their travel; the spinning of the filaments by the whirling action of a centrifuge; or from a combination of such forces. And it is very often advisable with many plastics to use a non-oxidizing elastic fluid for propelling, conveying, evaporating, etc., such as nitrogen, hydrogen, carbon dioxide, etc. If the source of supply of some plastics, such as certain polymeric amides, is maintained in a molten condition and the rotative speed of the tire is suitably regulated, the said source may be continuously drawn off by the periphery of the tire in a series of filaments and without any break in their continuity. If the stretching limit is exceeded, the propelling action of the elastic fluid will carry the broken filaments forward on to the tire, so that unless the breakage is excessive no substantial weakness will occur in the strength of the spun fabric. The amount of stretch given to the filaments, or their pulling or propulsion speed as compared with their extrusion speed, will generally depend upon the strength and fineness and kind of filamentous structure required.

Filaments may be spun from a molten, solution, or other state, and many different materials may be used separately or in combination with each other for a great variety of purposes. Such materials are glass, polymeric amides, polysulfides, polymers of chloroprene, plasticized polymers of vinyl chloride, polymers of isobutylene, and most other materials used as synthetic rubbers, in the manufacture of synthetic threads, and for extrusion and injection molding purposes. A preferred spinning composition is a polymeric amide or a vinylidene chloride polymer in mixture with an elastomeric material, such as a polymer of isobutylene, which may be anywhere up to equal parts by weight of the former. Elastomeric materials, plasticizers, accelerators, adhesives, etc., may be sprayed, or otherwise incorporated, in the spun fabrics, as the filaments of the latter are being deposited in position, for the purposes of: lubricating the filaments during their flexing movements; making the fabrics impervious to moisture; increasing their resistance to abrasion; bonding the fabrics to the tire; and for many other purposes.

The filling up of worn spots, the treading of the spun fabrics, and the vulcanizing or other curing of the reinforcements, may be accomplished by means of a suitably heated mold rotating in pressural contact with the tire supported by an inner mold while the spun fabric reinforcements are still in a plastic state; or such results may be obtained by subjecting the completely reinforced tire to heat and pressure in a tread mold, similar to the usual vulcanizing unit.

The invention is exemplified in the following description, and a preferred arrangement is illustrated by way of example, in the accompanying drawing, in which:

Fig. 1 is a cross-section through the tire construction apparatus showing the tire and rotating rim, in elevation.

Fig. 2 is a cross-section of the tread mold taken on line 2—2 of Fig. 1.

Fig. 3 is a part cross-section of the tire construction apparatus showing a modified form of spinning apparatus.

Fig. 4 is a part cross-section of the tire construction apparatus showing another modified form of the spinning apparatus.

Fig. 5 is a fragmentary plan view of the tire showing one way in which filaments of substantial length may be made to overlap one another.

Referring to the drawing more specifically by reference characters:

Figs. 1 and 2 show a cleaned and buffed tire 1 to be held in position by a suitably inflated curing tube mold 1a and the collapsible ring 2. The latter is driven through links 3, that are attached to a hub 4, by a shaft 5, from a source of power not shown; and connected to the tire shaft through gears 6 and 7, is the shaft 8, to which is fastened the split tread mold 9. The supports for the two driving shafts are the side walls 10 and 11, which also support an inner casing 12 and an outer casing 13, between which a heating fluid circulates from an inlet 14, controlled by a valve 15, to an outlet 16, controlled by a valve 17. The top and bottom spinnerets, or spinning ejectors, consist of outer cones 18 and inner cones 19, the latter enclosing resistance coils 20 in the electric circuit 21, which is controlled by the rheostat 22, the discharge orifices of the ejectors having a flexible connection with the outer casing so as to extrude the filaments tangentially with the periphery of the tire. An elastic fluid, such as air, for propelling, conveying, and dispersing the filaments, is supplied to the annular chamber between the cones by means of pipe 23. The spinning material is in the form of top and bottom plastic rods 24 and 25, respectively. These are fed into the inner cones by means of the top rolls 26 and the bottom rolls 27, respectively, and after becoming molten at a suitable temperature for spinning, are drawn or propelled in a series of filaments by the rotation of the tire or propulsion of the elastic fluid, which moves in the direction of their travel and issues from openings adjacent to and surrounding the filament outlets. In order to obtain the overlapping wavy structure 28 and 29, shown in Fig. 5, the ejectors are reciprocated in alternate movements by means of their supporting bars 30, that are pivoted by straps 31 on the supporting plates 32 and are driven by the eccentric straps 33; but the wavy structure never synchronizes with other wavy structures in successive plies because of the constantly increasing diameter of the tire. The filaments may be quenched, or otherwise treated, during stretching by a liquid from the spraying nozzle 34, which is supplied by pipe 35. Cotton or asbestos fibres, carbon black, silica, or any other suitable material to be interfelted with the spun filaments, may be fed from the hopper 36 through the feeding valve 37 and the pipe 38 upon the periphery of the tire. Such materials may also be blown into position, the exhaust gases escaping with those from the ejectors through the outlet 39, which may also serve as an outlet for an evaporative medium, coagulating fluid, or indurating fluid, entering at inlet 40; or, the inlet and outlet for such fluids may be reversed in order to treat the filaments counter-currently. Cord or woven fabric 41, to aid in the reinforcing of the tire, may be fed from the roll 42 through the casing slot 43, wound upon the tire, and interfelted with the spun fabric.

Figs. 3 and 4 show a modification of the spinning devices. In Fig. 3 a spinning material in a solvent state, or granular form, may be forced downward through pipes 44 and 45, and the temperature regulated by the resistance coils before being spun; in Fig. 4 the spinning solution is forced through a pipe 46 and spinneret 47, which are supported by ball bearings 48, and whirled by a blast of elastic fluid from the pipe 49 impinging on the air motor 50, the elastic fluid finally escaping between ribs 51 and through the pipe 52 to convey the filaments onto the periphery of the tire, where they are deposited in a promiscuously intersecting condition. The whirling of the filaments, in conjunction with the directing and propelling action of the elastic fluid, will cause the filaments to be disrupted and dispersed and finally deposited in a promiscuously intersecting and plastic condition. In the arrangement shown in Figs. 1 and 3 the filaments may be broken up and deposited in much the same manner, but, as already indicated, a preferred method is to deposit the spinning material as filaments of substantial length in a defined pattern. Any irregularity in depositing the fabric plies, or lack of balance in the tire, will ultimately be remedied by the tread mold, which is maintained in a fixed position. The pattern of the tread does not begin to form until the tire has reached a predetermined diameter, and then the pattern begins to build up until the tire has reached its maximum diameter. It is usually advisable not to allow the filaments to be stretched to their limit in the spinning operation, so that they may be further stretched when depressed into the tread without any substantial breakage, and this will result in a stronger tread. Vulcanizing or other curing of the tire may take place simultaneously with the spinning and reinforcing operations, or it may be accomplished thereafter. The side wall of the casing can then be swung back, one half of the tread mold taken out, the tire rim and tube mold collapsed, and the tire removed.

In the foregoing description, I have described how the periphery of a rotating wheel may be enclosed within a spun plastic fabric, but it is equally evident that by varying the relative operating positions of a plurality of spinnerets any moving object may be progressively enclosed within a spun fabric; and that a cable, telephone wire, or other cord, may be enclosed within a spun fabric in a progressive operation, by either rotating the cord, or rotating the tube through which the cord is drawn and filament conveying fluid is propelled. A rotating cord would wrap the spun filaments about itself; a whirling tube would cause the conveying fluid to wrap the filaments about the cord. After the cord has been wrapped by a spun fabric the latter may be made impervious to moisture by coating it with a suitable lacquer in any one of the well known ways.

It will also be obvious that the method and apparatus for reinforcing a tire is substantially the same for making a new tire as for reconditioning an old one. An old tire becomes the inner mold and the plastic fabrics are built thereupon to take the place of the tread and sidewalls during which the tire may be cured under heat and pressure, or the curing may be accomplished under heat and pressure in a separate mold in the usual manner; in making a new tire the spun plastic fabrics are built upon a suitable mold, which may be the inner tube and include the usual woven cord plies, bead cables, etc., between and upon which spun plastic fabrics may be interposed and deposited; or spun plastic fabrics, because of their flexibility and strength to resist severe shocks, carry internal air pressure, etc., may be substituted for the complete tire casing, with the exception of the bead cables, and about these the plastic fabrics may be spun. If the laminated plastic casing is vulcanized or otherwise bonded to the inner tube mold then the combination becomes a tubeless tire.

It will furthermore be evident that: a spinning material may be spun from a molten state and cooled, or spun from a solution, or other fluid state, and coagulated and/or indurated by a coagulating, evaporative, or other medium, in a dry or wet process; the spinning material may be spun as disrupted filaments, or into continuous filaments and disrupted, the broken filaments dispersed by either an elastic or liquid fluid, and the disrupted and dispersed filaments then deposited in a promiscuously intersecting condition to form an integral homogeneous fabric; or the filaments may be spun, dispersed, and deposited, as a plurality of filaments of substantial length, and in an overlapping condition to form an integral homogeneous fabric.

It will be understood throughout the specification and appended claims that the word "elastomer" is a generic term for all substances having the properties of natural, reclaimed, vulcanized, or synthetic rubber.

I claim as my invention:

1. The method of building a tire comprising: disrupting a spinning material into a plurality of filaments; depositing the said filaments in an intersecting condition to form an integral fabric upon a primary mold; stretching the said filaments during deposition by rotation of the said mold at a greater peripheral speed than the speed at which the filaments are formed; and passing the said fabric during the said rotation between the said mold and a secondary mold to form suitable treads in the fabric.

2. The method of building a tire comprising: disrupting a spinning material into a plurality of filaments; depositing the said filaments in an intersecting condition to form an integral fabric upon a primary mold; tensioning and stretching the said filaments during deposition by rotation of the said mold at a greater peripheral speed than the speed at which the filaments are formed; heating the said mold to a temperature suitable to cause the tensioned filaments to become embedded therein and bonded thereto; and rotating the built up primary mold in contact with a secondary mold to form suitable treads in the built up primary mold.

3. The method of building a tire comprising: disrupting a spinning material into a plurality of filaments; depositing the said filaments in an intersecting condition to form an integral fabric upon a primary mold; stretching the said filaments during deposition by rotation of the said mold at a greater peripheral speed than the speed at which the filaments are formed; repeating the said operations to build up successive windings of integral fabrics in superposed relation on the said mold to form an integral casing; bonding the said casing to the said mold; and passing the said casing during the said rotation between the said mold and a secondary mold to form suitable treads in the casing.

4. The method of building a tire comprising: disrupting a spinning material into a plurality of filaments; depositing the said filaments in an intersecting condition upon an inflatable inner mold; stretching the said filaments during deposition by rotation of the said mold at a greater peripheral speed than the speed at which the filaments are formed; repeating the said operations to build up successive windings of intersecting filaments in superposed relation on the said mold; bonding the said successive windings together to form an integral casing; passing the said casing during the said rotation between the said mold and an external mold to form suitable treads in the casing; and deflating the inner mold and removing the said casing therefrom.

5. The method of building a tire comprising: disrupting a spinning material into a plurality of filaments; depositing the said filaments in an intersecting condition upon an inner mold while the filaments are sufficiently plastic to adhere to one another to form an integral fabric; stretching the said filaments during deposition by rotation of the said mold at a greater peripheral speed than the speed at which the filaments are formed; repeating the said operations to build up successive windings of integral fabrics in superposed relation on the said mold to form an integral casing; subjecting the said casing to heat and pressure between the said mold and a rotating outer mold to form suitable treads in the casing.

6. The method of building a tire comprising: disrupting a spinning material into a plurality of filaments; depositing the said filaments in intermixture with discrete wear-resisting solids upon a primary mold while the filaments are sufficiently plastic to adhere to one another to form an integral fabric and to bond the said solids; repeating the said operation to build up successive windings of integral fabrics and bonded solids in superposed relation on the said mold to form an integral casing; and subjecting the said casing to heat and pressure between the said mold and a secondary mold to form suitable treads in the casing.

7. The method of building a tire comprising: disrupting a spinning material into a plurality of filaments; depositing the said filaments in an intersecting condition to form an integral fabric upon a primary mold; tensioning and stretching the said filaments during deposition by rotation of the said mold at a greater peripheral speed than the speed at which the filaments are formed; maintaining the said mold at suitable temperatures to cause the tensioned filaments to become embedded in the mold and bonded thereto; and passing the said fabric during the said rotation between the said mold and a secondary mold to form suitable treads in the fabric.

8. The method of building a tire comprising: disrupting a spinning material into a plurality of filaments; depositing the said filaments in an intersecting condition upon a primary mold; tensioning and stretching the said filaments during deposition by rotation of the said mold at a greater peripheral speed than the speed at which the filaments are formed; maintaining the said mold at a suitable temperature to cause the tensioned filaments to become embedded therein; building up successive windings of intersecting filaments upon the said embedded winding while the said windings are sufficiently plastic to adhere to one another and to the said mold; and passing the said windings during the said rotation between the said mold and a secondary mold to form suitable treads in the windings.

9. The method of building a tire comprising: disrupting a spinning material into a plurality of filaments; depositing the said filaments in intermixture with discrete wear-resisting solids upon a primary mold; tensioning and stretching the said filaments during deposition by rotation of the said mold at a greater peripheral speed than the speed at which the filaments are formed; maintaining the said mold at a suitable temperature to cause the tensioned filaments to become embedded therein and the said solids bonded thereto; repeating the said operations to build up successive windings of filaments upon the embedded winding to bond successive layers of wear-resisting solids to the said mold; and passing the said windings during the said rotation between the said mold and a secondary mold to form suitable treads in the windings.

10. The method of building a tire comprising: disrupting a spinning material into a plurality of molten filaments; depositing the said filaments in an intersecting condition to form an integral fabric upon a primary mold; stretching the said filaments during deposition by rotating the said mold at a greater peripheral speed than the speed at which the filaments are formed; impregnating the said fabric with an elastomeric material to render the fabric impervious to moisture; and passing the said fabric during the said rotation between the said mold and a secondary mold to form suitable treads in the fabric.

11. The method of building a tire comprising: disrupting a spinning material into a plurality of molten filaments; cooling the said filaments by contact with a quenching fluid; depositing the quenched filaments in an intersecting condition to form an integral fabric upon a primary mold; stretching the quenched filaments during deposition by rotation of the said mold at a greater peripheral speed than the speed at which the filaments are formed; impregnating the said fabric with an elastomeric material to render the fabric impervious to moisture; and passing the said fabric during the said rotation between the said mold and a secondary mold to form suitable treads in the fabric.

12. The method of building a tire comprising: disrupting a spinning material into a plurality of molten filaments; cooling the said filaments by contact with a quenching fluid; depositing the quenched filaments in an intersecting condition and in intermixture with discrete wear-resisting solids to form an integral fabric upon a primary mold; stretching the quenched filaments during deposition by rotation of the said mold at a greater peripheral speed than the speed at which the filaments are formed; impregnating the said fabric with an elastomeric material to render the fabric impervious to moisture; repeating the said operations to build up successive windings of integral fabrics in superposed relations on the said mold; and passing the said windings during the said rotation between the said mold and a secondary mold to form suitable treads in the windings.

13. In a tire building apparatus, the combination of: a primary mold; an enclosure for the said primary mold; means connected to the said enclosure for disrupting a spinning material into plastic filaments; means for conveying the said filaments to the said primary mold; means for rotating the primary mold at a speed greater than the speed of travel of the said filaments to stretch the filaments and wind them upon the mold; a secondary mold shaped and positioned to cut treads in the said windings by pressural contact during rotation of the two said molds; and means for rotating the said secondary mold.

14. In a tire building apparatus, the combination of: a primary mold; an enclosure for the said primary mold; means connected to the said enclosure for disrupting a spinning material into plastic filaments; means for conveying the said filaments to the said primary mold; means for rotating the primary mold at a speed greater than the speed of travel of the said filaments to stretch the filaments and wind them upon the mold; means for causing the said filaments to intersect one another and form an integral fabric casing as the filaments are deposited during the said winding; a secondary mold shaped and positioned to cut treads in the said fabric casing by pressural contact during rotation of the two said molds; and means for rotating the said secondary mold.

15. In a tire building apparatus, the combination of: a primary mold; an enclosure for the said primary mold; means connected to the said enclosure for disrupting a spinning material into plastic filaments; means for conveying the said filaments to the said primary mold; means for rotating the primary mold at a speed greater than the speed of travel of the said filaments to stretch the filaments and wind them upon the mold; means for causing the said filaments to intersect one another and form an integral fabric casing as the filaments are deposited during the said winding; means for incorporating wear resisting solids within the said fabric casing during formation thereof; a secondary mold shaped and positioned to cut treads in the said fabric casing by pressural contact during rotation of the two said molds; and means for rotating the said secondary mold.

FRED W. MANNING.